E. J. ROHRBACHER.
LUBRICATING GUN.
APPLICATION FILED MAY 22, 1911.
1,029,718.
Patented June 18, 1912.
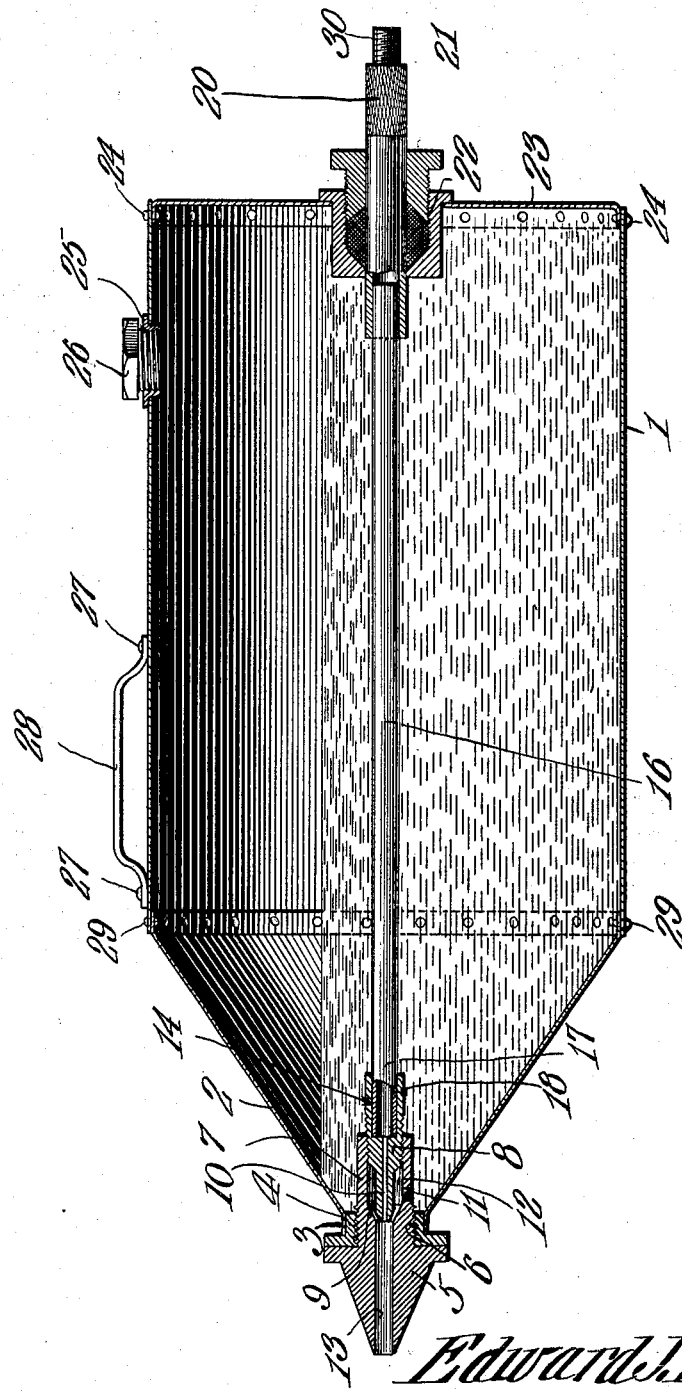
Witnesses
Edward J. Rohrbacher,
Inventor
by C. A. Snow & Co.
Attorneys

UNITED STATES PATENT OFFICE.

EDWARD J. ROHRBACHER, OF PORTLAND, OREGON.

LUBRICATING-GUN.

1,029,718.  Specification of Letters Patent.  Patented June 18, 1912.

Application filed May 22, 1911. Serial No. 628,657.

*To all whom it may concern:*

Be it known that I, EDWARD J. ROHRBACHER, a citizen of the United States, residing at Portland, in the county of Multnomah and State of Oregon, have invented a new and useful Lubricating-Gun, of which the following is a specification.

This invention relates to a new and useful ejecting apparatus, adapted especially for spraying oil and the like, in order to spray or lubricate various parts of engines.

One of the principal objects of the invention is the provision of means for regulating the spraying of the oil, and furthermore to utilize an air pressure for forcing and spraying the oil from a receptacle or tank.

In the drawings there is disclosed one particular form of the invention, but in practical use this form may require changes or alterations, to which the applicant is entitled, provided the changes or alterations are comprehended within the scope of what is claimed.

In the drawings there is disclosed a single sectional view of the spraying apparatus, which consists of a tank 1 having one end conical as shown at 2. This conical end terminates in a cylindrical portion 3, in which a brass bushing 4 is brazed or soldered. A plug 5, the outer forward portion of which is tapering, is threaded into the brass bushing 4 as shown at 6. The inner portion of the plug 5 is slightly reduced as indicated at 7 and threaded into this reduced portion is a needle valve 8, adapted to be adjusted in order to coöperate with a valve seat 9 in the duct 13 of the plug. The valve 8 is provided with a restricted bore 10, through which air under pressure is forced, in order to carry and spray the oil from the tank 1, the oil being drawn or sucked through an orifice 11, forming a communication between the tank 1 and a chamber 12 in the plug 5. By screwing the valve 8 in one direction or the other, the space between the valve and the seat 9 is adjusted and outflow of oil through the duct 13 is regulated. The inner end of the valve 8 is hollowed out as shown at 14, and into this hollowed out portion a pipe 16 protrudes. This pipe 16 extends longitudinally through the tank, and the end 17 of the pipe is provided with a sweat connection 18 uniting the pipe with the valve 8 to cause the pipe 16 to rotate with the valve. Air under pressure is forced through the pipe 16, and when air emanates from the restricted duct or bore 10 of the valve 8, it carries with it the oil from the tank 1.

The rear end of the tube or pipe 16 is provided with a knurled portion 20, whereby the pipe or tube may be manipulated, in order to adjust the position of the valve 8. The knurled portion 20 is located beyond a stuffing box 22, which is carried by the closure 23 of the tank, and through the stuffing box the pipe or tube 16 extends. It is clear that this stuffing box 22 prevents leakage of the oil from the tank 1. The closure 23 may be secured to the tank 1 by means of rivets 24. The tank 1 has secured in the wall thereof a bushing 25, into which a plug or closure member 26 is threaded. By the removal of this closure member 26 the tank 1 may be rapidly filled with the desired quantity of oil. As shown at 27 the tank 1 has secured to it a handle 28, by which the tank may be easily handled, in order to hold it in various positions for spraying different parts of engines, machinery and the like.

The conical part 31 of the tank 1 is constructed of a separate piece of metal from that forming cylindrical part 32, and the two are soldered or riveted together as shown at 29. The joints between the cylindrical part 32 of the tank 1 and the conical part 31 and between the closure member 23 and the cylindrical part, are of such a nature as to prevent leakage. The rear end of the pipe or tube 16 is threaded as shown at 30, and in practice, a tube from any suitable air pressure apparatus may be connected with the portion 30, in order to force air through the tube 16 and the valve 8.

From the foregoing in connection with the drawings it will be observed that a novel form of oil spraying apparatus is provided, and one which may be manufactured very reasonably and placed upon the market at a slight cost.

The invention having been set forth, what is claimed as new and useful is:

In a device of the class described, an oil tank; a plug rigidly engaged intermediate its ends in one end wall of the tank, the inner end of the plug projecting into the tank and being spaced from the side wall of the tank, to permit the oil to surround the inner end of the plug, the plug having a restricted bore at its discharge end, and an enlarged chamber at its inner end, there being a tapered valve seat at the juncture of the chamber and the bore, the inner end of the plug having a lateral opening through its side wall, forming a communication between the chamber and the interior of the tank; a packing gland in the other end wall of the tank; a pipe rotatable in the gland and accessible from the outside of the tank; a tubular valve secured to the inner end of the pipe and having a restricted bore, the valve being threaded into the chamber, to constitute a closure for the inner end of the plug, the valve being reduced in diameter within the chamber, to permit oil at all times to enter the chamber, through the opening, the valve having a tapered end, adapted to engage the valve seat, when the valve is rotated, by the manipulation of the outer end of the pipe.

In testimony that I claim the foregoing as my own, I have hereto affixed my signature in the presence of two witnesses.

EDWARD J. ROHRBACHER.

Witnesses:
 H. H. NEWHALL,
 H. F. PUPKE, Jr.

---

Copies of this patent may be obtained for five cents each, by addressing the "Commissioner of Patents. Washington, D. C."